Patented Mar. 12, 1935

1,994,025

UNITED STATES PATENT OFFICE 1,994,025

PRODUCTION OF VAT DYESTUFFS OF THE BENZANTHRONE SERIES

Heinrich Neresheimer, Ludwigshafen-on-the-Rhine, Germany, assignor to General Aniline Works, Inc., New York, N. Y., a corporation of Delaware No Drawing. Application February 7, 1930, Serial No. 426,770. In Germany February 13, 1929

4 Claims. (Cl. 260—36)

The present invention relates to the production of vat dyestuffs of the benzanthrone series.

It has already been proposed to produce new and valuable vat dyestuffs to which the ring system I is common by causing acid condensing agents to act on acylamino derivatives of (2-benzanthronyl)-1-aminoanthraquinone (II)

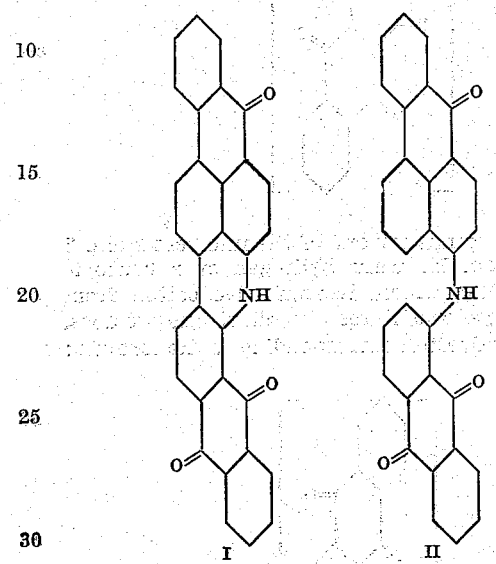

the acylamino group or the acyl radicle being replaced by other substituents or by hydrogen if desired.

The simplest representative of this series, the dyestuff having the formula I, dyes cotton dark green shades from a reddish blue vat and dissolves in concentrated sulfuric acid giving a reddish blue coloration; it is thus entirely different in tinctorial properties from the vat dyestuff obtainable by treating (2-benzanthronyl)-1-aminoanthraquinone (formula II) with acid condensing agents according to Example 1 of the Patent No. 1,711,710, which dyestuff gives orange red dyeings from a brown red vat and dissolves in concentrated sulfuric acid giving a red brown coloration.

I have now found that not only are the acylamino compounds of (2-benzanthronyl)-1-aminoanthraquinone (II) converted into derivatives of the dyestuff I by treatment with acid condensing agents, but that dyestuffs, to which it is possible, by reason of their analysis, dyeings and reactions, to assign the same ring system I are obtained by treating the halogenation products of (2-benzanthronyl)-1-amino-anthraquinone or its substitution products with non-alkaline, i. e. neutral or acid, agents having a dehydrogenating action, in particular acid condensing agents, such as for example sulfuric acid, chlorosulfonic acid and aluminum chloride, whereby further substitution, for example sulfonation or halogenation, or oxidation may simultaneously be effected. By the term "halogenation products of (2-benzanthronyl)-1-aminoanthraquinone or its substitution products" I understand the products obtainable from (2-benzanthronyl)-1-aminoanthraquinone or its substitution products containing halogen or an acylamino group by a treatment with halogen or halogenating agents.

The new dyestuffs mostly crystallize from organic solvents and dye cotton from blue vats yellow-green to blue-gray shades.

The following examples will further illustrate how the said invention may be carried out in practice but the invention is not restricted to these examples. The parts are by weight.

Example 1

20 parts of tribromo-(2-benzanthronyl)-1-aminoanthraquinone (obtainable by treatment of (2-benzanthronyl)-1-aminoanthraquinone with an excess of bromine without diluents and which crystallizes in the form of orange needles from nitrobenzene) are heated to from 70° to 75° centigrade for about 3 hours with 120 parts of chlorosulfonic acid. The reaction mixture is then diluted with 60 per cent sulfuric acid until the dark blue sulfate of the new dyestuff which has a metallic lustre has been precipitated. This is then filtered off and decomposed by treatment with water. The dyestuff thus obtained is a dark green powder, and forms emerald green needles when crystallized from meta-cresol. It dissolves in concentrated sulfuric acid giving a yellow green coloration and dyes cotton fast green shades from a blue vat.

A dyestuff, probably identical with this, is formed when (2-benzanthronyl)-1-aminoanthraquinone is gradually heated to from 70° to 75° centigrade with a solution of bromine in chlorosulfonic acid.

If instead of the tribromo-(2-benzanthronyl)-1-aminoanthraquinone, the dibromo product which crystallizes in scarlet red prisms and is obtainable by brominating (2-benzanthronyl)-1-aminoanthraquinone in nitrobenzene, be employed, a vat dyestuff giving bluish-green dyeings is obtained.

A still more bluish dyestuff is obtained when the dichloro-(2-benzanthronyl)-1-aminoanthraquinone (prepared from (2-benzanthronyl)-1-aminoanthraquinone by treatment with chlorine in dichloracetic acid) is heated with chlorosulfonic acid.

*Example 2*

10 parts of dibromo-monochloro-(2-benzanthronyl)-1-aminoanthraquinone (crystallizing in the form of orange needles from nitrobenzene and obtainable by brominating the condensation product from 1 molecular proportion of 2.6-dichlorobenzanthrone and 1 molecular proportion of 1-aminoanthraquinone with an excess of bromine in the absence of diluents) are introduced while stirring at from 80° to 85° centigrade into 100 parts of chlorosulfonic acid, and the reaction mixture is stirred at this temperature until the formation of dyestuff is completed. The dyestuff, which is obtainable in almost a quantitative yield by pouring the solution into water, is very similar to the dyestuff prepared according to the first paragraph of Example 1.

If fuming sulfuric acid (10 per cent) be employed instead of chlorosulfonic acid, a vat dyestuff is obtained which dyes cotton blue-gray shades from a blue vat.

*Example 3*

A mixture of 20 parts of mono-(2-benzanthronyl)-1.4-diamino-anthraquinone having the formula:

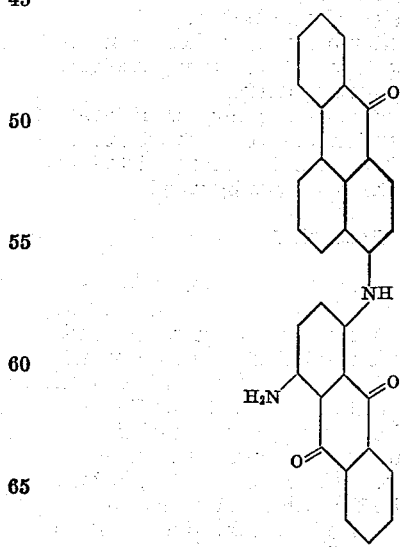

200 parts of benzoyl chloride and 30 parts of bromine are stirred for 2½ hours at from 40° to 50° centigrade and then for 2 hours at from 190° to 200° centigrade; after cooling the whole is diluted with 400 parts of nitrobenzene and the gray violet crystalline precipitate is filtered off and washed with alcohol. If the product thus obtained, which has been formed from the initial material by the introduction of a benzoyl radicle and two bromine atoms, which can scarcely be vatted and which has no affinity for the vegetable fibre, be boiled for a short time with nitrobenzene, a yellow green solution is obtained which solidifies to a green crystal pulp when cooled. The new dyestuff, which according to analysis contains two bromine atoms and a benzoylamino group in the molecule and which must have been formed from the initial material by the loss of two hydrogen atoms, dissolves in concentrated sulfuric acid giving a red-violet coloration and dyes cotton very fast yellow-green shades from a blue-violet vat.

What I claim is:—

1. Vat dyestuffs corresponding to the general formula:

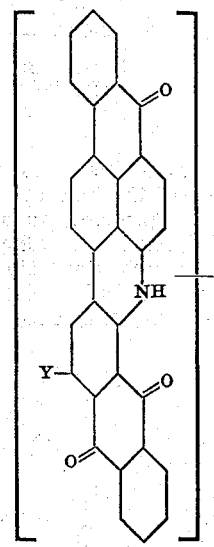

wherein $x$ stands for one of the numbers 2 and 3 and wherein Y means hydrogen or a benzoylamino group, which dyestuffs dye cotton from blue vats yellowish green to bluish gray shades.

2. A vat dyestuff corresponding to the formula:

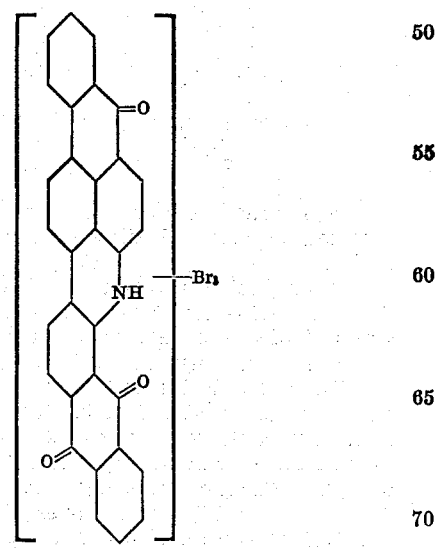

which dissolves in concentrated sulfuric acid giving a yellowish green solution and dyes cotton fast green shades from a blue vat.

3. A vat dyestuff corresponding to the formula:

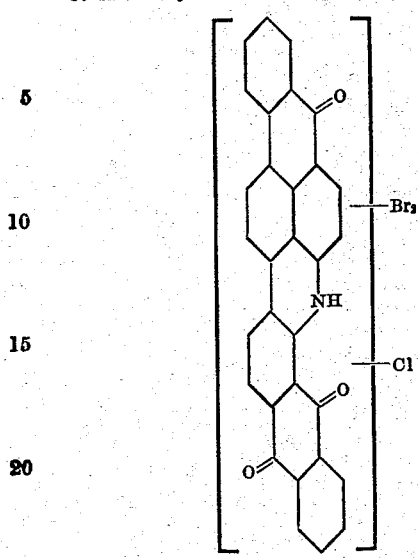

which dissolves in concentrated sulfuric acid giving a yellowish green solution and dyes cotton from a blue vat fast green shades.

4. A vat dyestuff corresponding to the formula:

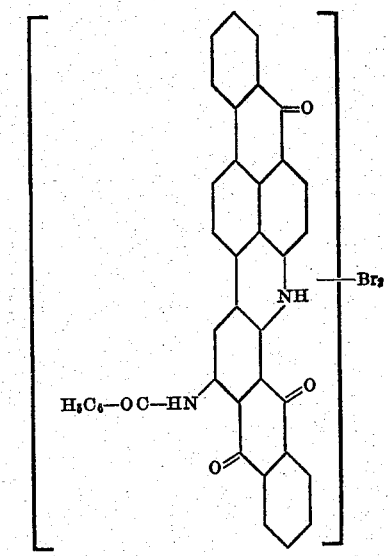

which dissolves in concentrated sulfuric acid giving a reddish violet solution and dyes cotton from a bluish violet vat fast yellowish green shades.

HEINRICH NERESHEIMER.